US011232425B2

(12) United States Patent
Kakino

(10) Patent No.: US 11,232,425 B2
(45) Date of Patent: Jan. 25, 2022

(54) SELF-SERVICE CHECKOUT TERMINAL WITH A SECURITY FUNCTION BASED ON DETECTION OF WEIGHT OF ITEMS

(71) Applicant: TOSHIBA TEC KABUSHIKI KAISHA, Tokyo (JP)

(72) Inventor: Tomonari Kakino, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 203 days.

(21) Appl. No.: 16/567,699

(22) Filed: Sep. 11, 2019

(65) Prior Publication Data

US 2020/0005268 A1 Jan. 2, 2020

Related U.S. Application Data

(63) Continuation of application No. 15/671,515, filed on Aug. 8, 2017, now abandoned.

(30) Foreign Application Priority Data

Sep. 7, 2016 (JP) .............................. JP2016-174653

(51) Int. Cl.
*G06Q 20/18* (2012.01)
*G06Q 20/20* (2012.01)
(Continued)

(52) U.S. Cl.
CPC ........... *G06Q 20/208* (2013.01); *G06Q 20/18* (2013.01); *G06Q 20/206* (2013.01); *G06Q 30/04* (2013.01);
(Continued)

(58) Field of Classification Search
None
See application file for complete search history.

(56) References Cited

U.S. PATENT DOCUMENTS 6,522,772 B1 2/2003 Morrison et al.
6,779,722 B1 8/2004 Mason
(Continued)

FOREIGN PATENT DOCUMENTS

EP 1933267 A2 6/2008
JP 2000187777 A 7/2000
(Continued)

OTHER PUBLICATIONS

European Search Report dated Oct. 25, 2017, mailed in counterpart European Application No. 17187744, 6 pages.
(Continued)

*Primary Examiner* — Paul Danneman
(74) *Attorney, Agent, or Firm* — Kim & Stewart LLP

(57) ABSTRACT

A self-service checkout terminal includes an optical code reader, a platform on which items to be purchased are placed, a weight sensor configured to detect a weight of objects placed on the platform, and a processor configured to operate in a first mode and a second mode. The processor carries out a registration process based on a merchandise code corresponding to a code symbol read from an item by the optical code reader while enabling a confirmation process to confirm proper item placement based on the weight detected by the weight sensor in the first mode, and carries out the registration process while disabling the confirmation process in the second mode.

10 Claims, 8 Drawing Sheets

(51) Int. Cl.
*G06Q 30/04* (2012.01)
*G07G 1/00* (2006.01)
*H04L 29/06* (2006.01)

(52) U.S. Cl.
CPC ........ *G07G 1/0072* (2013.01); *H04L 63/0861* (2013.01)

(56) References Cited

U.S. PATENT DOCUMENTS

| | | | |
|---|---|---|---|
| 7,673,797 | B2 | 3/2010 | Edwards |
| 7,866,546 | B1 * | 1/2011 | Vance ............... G07F 9/006 235/379 |
| 9,033,227 | B2 | 5/2015 | Kobres |
| 2003/0006098 | A1 * | 1/2003 | Wike, Jr. ............ G07G 1/0036 186/61 |
| 2003/0024982 | A1 | 2/2003 | Bellis, Jr. et al. |
| 2003/0115103 | A1 | 6/2003 | Mason |
| 2007/0288320 | A1 | 12/2007 | Cooper et al. |
| 2011/0320296 | A1 | 12/2011 | Edwards |
| 2014/0338987 | A1 | 11/2014 | Kobres |
| 2015/0112825 | A1 | 4/2015 | Konishi et al. |

FOREIGN PATENT DOCUMENTS

| | | |
|---|---|---|
| JP | 2001076261 A | 3/2001 |
| JP | 2002-367030 A | 12/2002 |
| JP | 2004252865 A | 9/2004 |
| JP | 2008152777 A | 7/2008 |
| JP | 2014-029589 A | 2/2014 |

OTHER PUBLICATIONS

Japanese Notice of Reasons for Refusal dated Jul. 14, 2020 in counterpart Japanese Patent Application No. 2016-174653, 6 pages (with Translation).

* cited by examiner

SELF-SERVICE CHECKOUT TERMINAL WITH A SECURITY FUNCTION BASED ON DETECTION OF WEIGHT OF ITEMS

CROSS-REFERENCE TO RELATED APPLICATIONS

This application is a continuation of U.S. patent application Ser. No. 15/671,515, filed on Aug. 8, 2017, which is based upon and claims the benefit of priority from Japanese Patent Application No. 2016-174653, filed on Sep. 7, 2016, the entire contents of each of which are incorporated herein by reference.

FIELD

Embodiments described herein relate generally to a self-service checkout terminal for use by customers.

BACKGROUND

A self-service checkout terminal of one type allows a customer to perform registration of merchandise to be purchased and payment for the merchandise. In such the self-service checkout terminal, a security program is provided to prevent the customer from carrying out a fraudulent activity.

On the other hand, a casher of a store may operate the self-service checkout terminal to assist a customer who is unfamiliar with how to operate the self-service checkout terminal. In this case, when the security program for preventing the fraudulent activity is activated, the cashier may not be able to smoothly operate the self-service checkout terminal. In addition, the security program may decrease usability of a reliable customer who is unlikely to commit the fraudulent activity.

DETAILED DESCRIPTION

An embodiment provides a self-service checkout device and a program capable of improving operability of operation by a salesperson or a certain excellent customer by disabling or relaxing security.

In general, according to an embodiment, a self-service checkout terminal includes an optical code reader, a platform on which items to be purchased are placed, a weight sensor configured to detect a weight of objects placed on the platform, and a processor configured to operate in a first mode and a second mode. The processor carries out a registration process based on a merchandise code corresponding to a code symbol read from an item by the optical code reader while enabling a confirmation process to confirm proper item placement based on the weight detected by the weight sensor in the first mode, and carries out the registration process while disabling the confirmation process in the second mode.

First Embodiment

Figure 1:
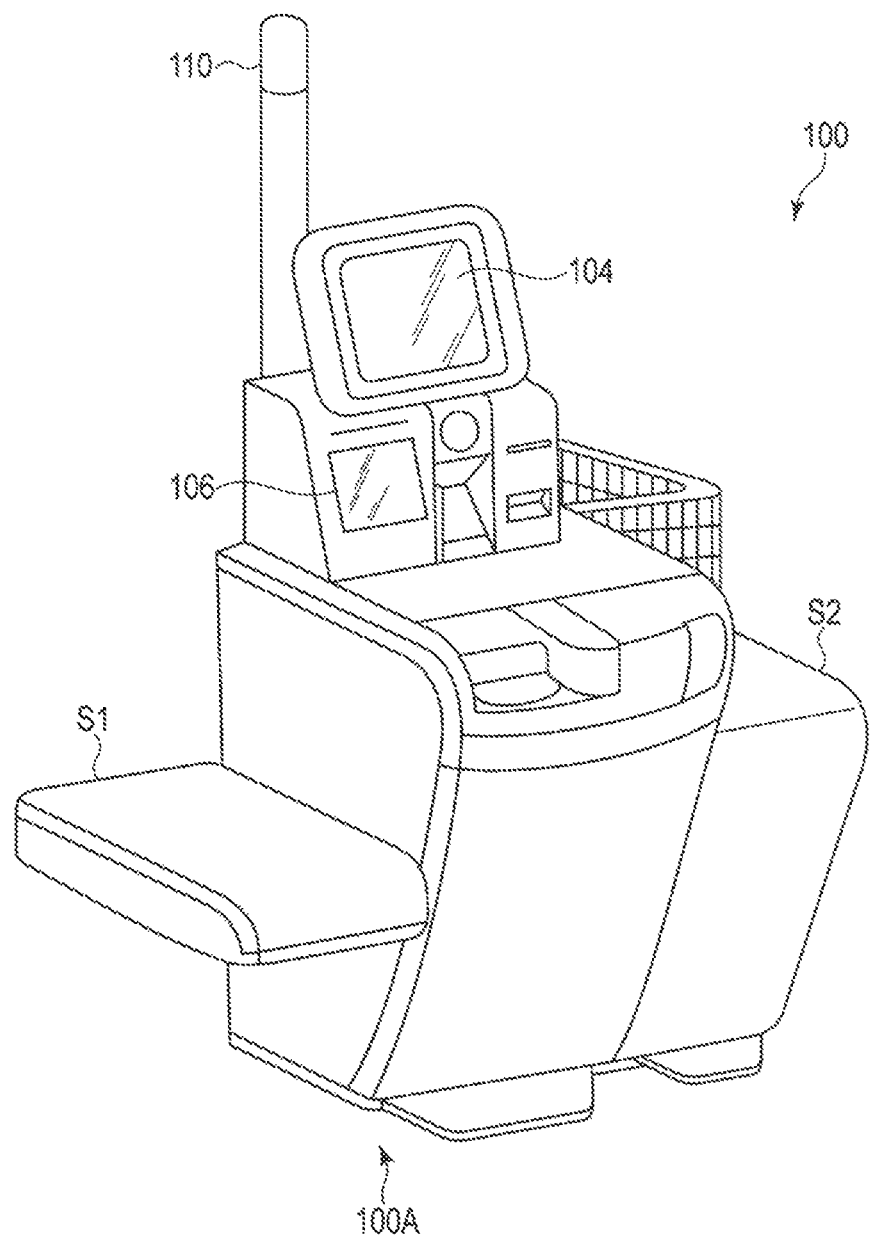
FIG. 1 is a perspective view of a self-service checkout device according to a first embodiment and a second embodiment.
Figure 2:
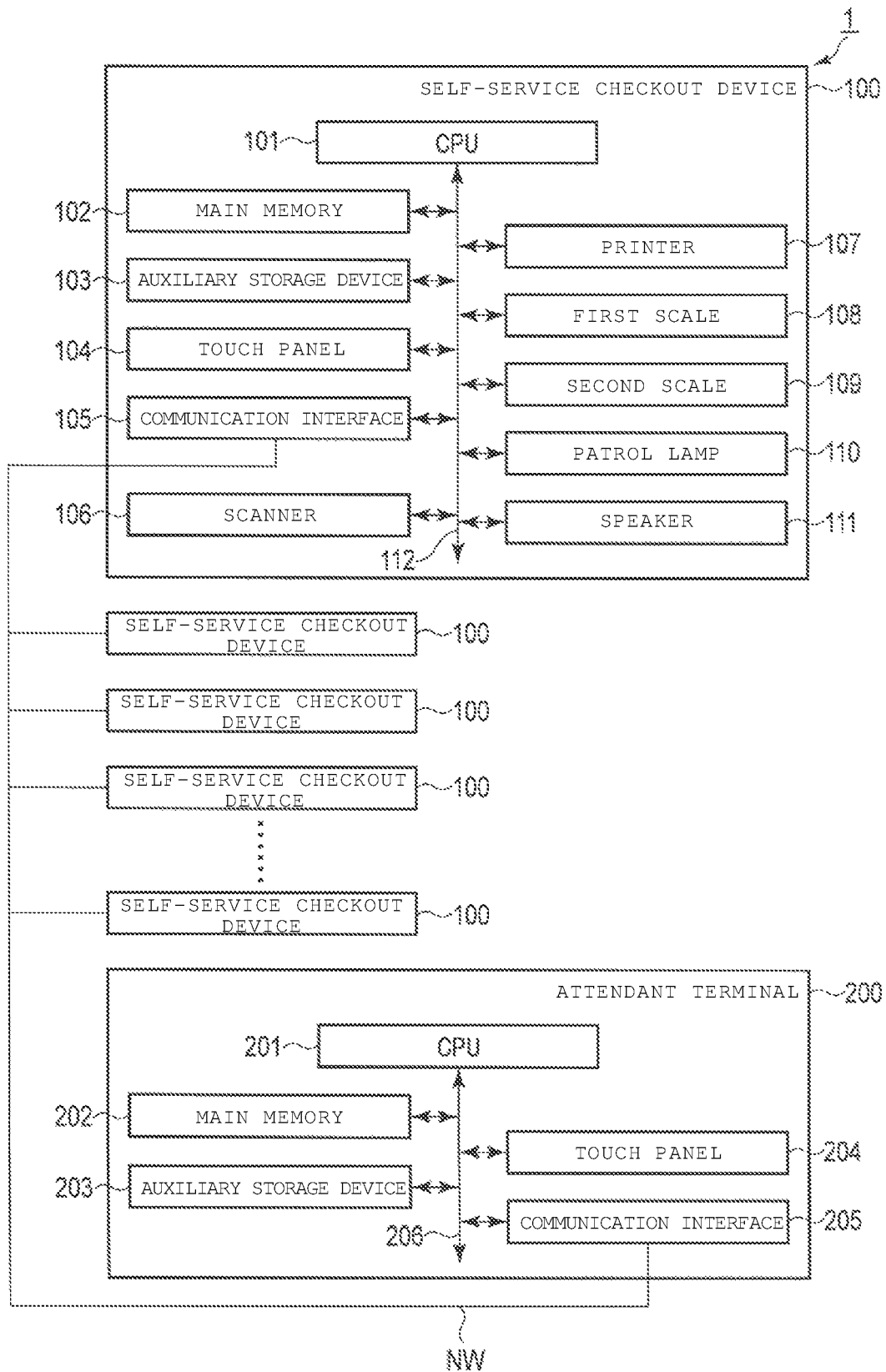
FIG. 2 is a block diagram OF a main circuit configuration of each of devices included in a self-service checkout system according to the first embodiment.

Hereinafter, a self-service checkout device according to a first embodiment will be described with reference to drawings. FIG. 1 is a perspective view of an exterior of a self-service checkout device 100 according to the first embodiment. FIG. 2 is a block diagram of a main circuit configuration of each of devices included in a self-service checkout system 1 including the self-service checkout device 100 according to the first embodiment. In FIG. 2, the same elements as those in FIG. 1 are denoted by the same reference numerals as those in FIG. 1. The self-service checkout system 1 includes a plurality of self-service checkout devices 100 and an attendant terminal 200. The plurality of self-service checkout devices 100 and the attendant terminal 200 are connected to a network NW. The network NW is typically a local area network (LAN). The network NW may be a wireless line or a wired line. In addition, wireless lines and wired lines may be mixed. Although the plurality of self-service checkout devices 100 is illustrated in FIG. 2, circuit configurations are illustrated with respect one of the self-service checkout devices 100 representatively. In addition, although the plurality of self-service checkout devices 100 is illustrated in FIG. 2, the number of the self-service checkout devices included in the self-service checkout system 1 may be any number and may be one.

The self-service checkout device 100 is located at a store or the like for business such as registration and payment of merchandise, which is a payment target. Although the self-service checkout device 100 is mainly operated by a shopper, the self-service checkout device 100 may be operated by a salesperson in response to a request from the shopper. The self-service checkout device 100 has two operation modes of a salesperson mode and a normal mode. A specific operator such as a salesperson can operate the self-service checkout device 100 in the salesperson mode. In the salesperson mode, a security setting according to the normal mode is disabled. Alternatively, in the salesperson mode, a security setting lower than that for the normal mode is activated. The self-service checkout device 100 includes a housing 100A placed on a floor surface. A first placing table S1 is provided on one side surface of the housing 100A and a second placing table S2 is provided on the other side surface. The first placing table S1 is a table for placing merchandise before registration. Then, the second placing table S2 is a table for placing registered merchandise. The self-service checkout device 100 includes a central processing unit (CPU) 101, a main memory 102, an auxiliary storage device 103, a touch panel 104, a communication interface 105, a scanner 106, a printer 107, a first scale 108, a second scale 109, a patrol lamp 110, a speaker 111, and a bus 112.

The CPU 101 corresponds to a central part of a computer which performs a process and control necessary for operation of the self-service checkout device 100. The CPU 101 controls each unit of the self-service checkout device 100 to perform various functions of the self-service checkout device 100 based on an operating system and a program such as application software stored in the main memory 102.

The main memory 102 corresponds to a main storage device of the computer. The main memory 102 stores the operating system and the program such as application software. In addition, the main memory 102 stores data to be referred when the CPU 101 performs various processes. Further, the main memory 102 is used as a so-called work area for storing data temporarily used when the CPU 101 performs various processes.

The auxiliary storage device 103 corresponds to an auxiliary storage device of the computer. The auxiliary storage device 103 is, for example, an electric erasable programmable read-only memory (EEPROM), a hard disc drive (HDD), or a solid state drive (SSD). The auxiliary storage device 103 stores data used when the CPU 101 performs various processes or data generated through a process of the CPU 101. The auxiliary storage device 103 may store the operating system and the program such as application software. In addition, the auxiliary storage device 103 also stores a merchandise list, which is a list of merchandise registered as sales merchandise. Alternatively, the main memory 102 may store the merchandise list. Further, the auxiliary storage device 103 stores a reference value d1 and a reference value d2. Alternatively, the main memory 102 stores the reference value d1 and the reference value d2. The reference value d1 and the reference value d2 respectively indicate an upper limit of an acceptable difference in determination of weights. The reference value d1 and the reference value d2 are set in advance by an administrator or the like of the self-service checkout device 100. In a case where a value of the reference value d1 or the reference value d2 is not set by an administrator or the like of the self-service checkout device 100, the reference value d1 or the reference value d2 is set to a default value. Default values of the reference value d1 and the reference value d2 are, for example, set in advance by a manufacturer of the self-service checkout device 100. In addition, the auxiliary storage device 103 stores a salesperson ID (identifier), which is a unique identification number assigned to each of salespersons who work at the store. The salesperson ID is an example of operator identification information. Further, the auxiliary storage device 103 also stores a merchandise database including various kinds of information such as a merchandise code, a merchandise name, and amount of money for merchandise to be sold at a store. In addition, the auxiliary storage device 103 also stores a device ID of the self-service checkout device 100. The device ID is a unique identification number and is set to each of the plurality of self-service checkout devices 100 in advance.

The program stored in the main memory 102 or the auxiliary storage device 103 includes a control program, which is described with respect to a control process described below. As one example, in a state where the control program is stored in the main memory 102 or the auxiliary storage device 103, the self-service checkout device 100 is provided to an administrator or the like of the self-service checkout device 100. However, in a state where the control program is not stored in the main memory 102 or the auxiliary storage device 103, the self-service checkout device 100 may be provided to the administrator or the like of the self-service checkout device 100. A control program which is separately provided to the administrator or the like may be written into the main memory 102 or the auxiliary storage device 103 under control of the administrator or a service person. At this time, transfer of the control program can be carried out by recording the control program on a removable recording medium such as a magnetic disk, a magneto-optical disk, an optical disk, and a semiconductor memory or by downloading via a network.

The touch panel 104 functions as a display device for displaying a screen for notifying various kinds of information to an operator of the self-service checkout device 100. The touch panel 104 is attached to the housing 100A illustrated in FIG. 1. In addition, the touch panel 104 functions as an input device for receiving touch operation by the operator.

The communication interface 105 is an interface for communication of the self-service checkout device 100 via the network NW.

The scanner 106 reads a barcode presented on merchandise or the like and outputs a merchandise code corresponding to the barcode. Although the scanner 106 is fixed to the housing 100A of the self-service checkout device 100 in FIG. 1, the scanner 106 may be a hand-held type.

The printer 107 prints a receipt or the like. As the printer 107, various types of printers such as a dot impact printer, an ink jet printer, a thermal printer, a laser printer, or other printer can be used.

The first scale 108 is provided to measure a weight of unregistered merchandise. As one example, the first scale 108 is embedded in the first placing table S1. The first scale 108 measures a weight of objects placed on the first placing table S1 and outputs the weight as electronic data.

The second scale 109 is provided to measure a weight of registered merchandise. As one example, the second scale 109 is embedded in the second placing table S2. The second scale 109 measures a weight of the merchandise placed on the second placing table S2 and outputs the weight as electronic data.

In FIG. 1, the patrol lamp 110 is attached to a tip end of a pole extending in a vertical direction to be visible from afar. The patrol lamp 110 includes a light emitting member such as a light-emitting diode (LED), a fluorescent lamp, an incandescent lamp, and a cylinder. The light emitting member is attached inside the cylinder so as to be rotatable coaxially with the cylinder. When the patrol lamp 110 operates, the patrol lamp 110 rotates the light emitting member while causing the light emitting member to emit light.

The speaker 111 outputs sound corresponding to an input audio signal.

The bus 112 includes an address bus, a data bus, and the like and transmits a signal exchanged by each of units of the self-service checkout device 100.

The attendant terminal 200 is installed for an object of monitoring various situations with respect to each of the self-service checkout devices 100 connected via the network NW. The attendant terminal 200 includes a CPU 201, a main memory 202, an auxiliary storage device 203, a touch panel 204, a communication interface 205, and a bus 206.

The CPU 201 corresponds to a central part of a computer which performs a process and control necessary for operation of the attendant terminal 200. The CPU 201 controls each of units to perform various functions of the attendant terminal 200 based on an operating system and a program such as application software stored in the main memory 202.

The main memory 202 corresponds to a main storage device of the computer. The main memory 202 stores the operating system and the program such as application software. In addition, the main memory 202 stores data to be referred when the CPU 201 performs various processes. Further, the main memory 202 is used as a so-called work area for storing data temporarily used when the CPU 201 performs various processes.

The auxiliary storage device 203 corresponds to an auxiliary storage device of the computer. The auxiliary storage device 203 is, for example, an EEPROM, an HDD, or an SSD. The auxiliary storage device 203 stores data used when the CPU 201 performs various processes or data generated by a process of the CPU 201. The auxiliary storage device 203 may store the operating system and the program such as application software.

The program stored in the main memory 202 or the auxiliary storage device 203 includes a control program, which is described with respect to a control process described below. As one example, in a state where the control program is stored in the main memory 202 or the auxiliary storage device 203, the attendant terminal 200 is provided to a user. However, in a state where the control program is not stored in the main memory 202 or the auxiliary storage device 203, the attendant terminal 200 may be provided to the user. A control program which is separately provided to the user or the like may be written into the main memory 202 or the auxiliary storage device 203 under control of the user or a service person. At this time, transfer of the control program can be realized by recording the control program on a removable recording medium such as a magnetic disk, a magneto-optical disk, an optical disk, and a semiconductor memory or by downloading via a network.

The touch panel 204 functions as a display device for displaying a screen for notifying various kinds of information to an operator of the attendant terminal 200. In addition, the touch panel 204 functions as an input device for receiving touch operation by the operator.

The communication interface 205 is an interface for communication of the attendant terminal 200 via the network NW.

The bus 206 includes an address bus, a data bus, and the like and transmits a signal exchanged by each of units of the attendant terminal 200.

Hereinafter, operation of the self-service checkout system 1 using the self-service checkout device 100 according to the first embodiment will be described with reference to FIGS. 3 to 8. Furthermore, contents of a process in the operation to be described below is one example, various processes can be appropriately performed so as to achieve same results. In the first embodiment, the main memory 102 or the auxiliary storage device 103 of the self-service checkout device 100 stores a control program described with respect to control processes illustrated in FIGS. 3 to 7. FIGS. 3 to 7 are flowcharts of control processes according to the CPU 101 of the self-service checkout device 100. The CPU 101 executes the control process based on the control program stored in the main memory 102 and the auxiliary storage device 103. In addition, in the first embodiment, the main memory 202 or the auxiliary storage device 203 of the attendant terminal 200 stores a control program described with respect to a control processes illustrated in FIG. 8. FIG. 8 is a flowchart of a control process by the CPU 201 of the attendant terminal 200. The CPU 201 executes the control process based on the control program stored in the main memory 202 and the auxiliary storage device 203.

Figure 3:
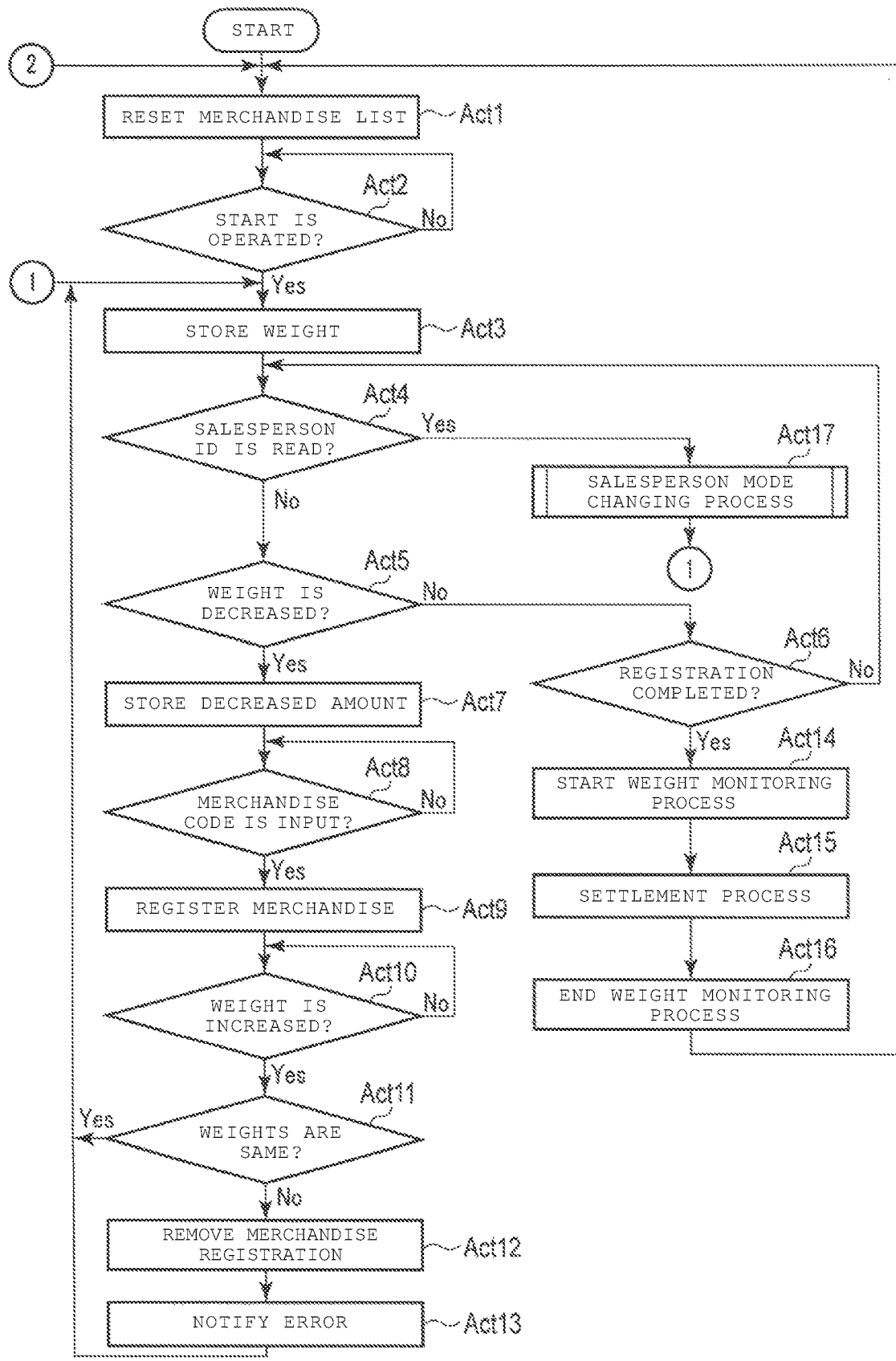
FIG. 3 is a flowchart of a control process according to the first embodiment, carried out by a CPU of the self-service checkout device in FIG. 2.

In Act 1 of FIG. 3, the CPU 101 resets a merchandise list stored in the main memory 102 or the auxiliary storage device 103. That is, the CPU 101 instructs the main memory 102 or the auxiliary storage device 103 so that no merchandise is registered in the merchandise list.

An operator of the self-service checkout device 100 puts merchandise which a customer wants to purchase in a shopping basket and places the shopping basket on the first placing table S1. Alternatively, the operator does not put merchandise which the customer wants to purchase in the shopping basket and may place the merchandise on the first placing table S1 directly. Then, the operator touches a start button displayed on the touch panel 104 of the self-service checkout device 100. The start button is operated by the operator of the self-service checkout device 100 in a case where a start of merchandise registration is instructed. In Act 2, the CPU 101 waits for operation to instruct the start of merchandise registration. That is, the CPU 101 waits for predetermined operation such as touching the start button displayed on the touch panel 104 to instruct the start of merchandise registration. When the operation to instruct the start of merchandise registration is performed, the CPU 101 makes a determination of Yes in Act 2 and the process proceeds to Act 3.

In Act 3, the CPU 101 obtains the weight output by the first scale 108 and stores the weight in the main memory 102 as a first weight. Further, the CPU 101 obtains the weight output by the second scale 109 and stores the weight in the main memory 102 as a second weight.

In Act 4, the CPU 101 checks whether or not a barcode storing the salesperson ID is read by the scanner 106. By performing a process of Act 4, a computer having the CPU 101 as a center operates as an authentication unit which authenticates whether or not an operator is a predetermined specific operator. When the salesperson ID is not read, the CPU 101 makes a determination of No in Act 4 and the process proceeds to Act 5.

In Act 5, the CPU 101 checks whether or not the weight output by the first scale 108 is decreased. At this time, the CPU 101 obtains the weight output by the first scale 108. Then, the CPU 101 calculates a decreased amount by subtracting the weight obtained by the first scale 108 from the first weight stored in Act 3. If the decreased amount is equal to or larger than a predetermined value, the CPU 101 regards the weight output by the first scale 108 as being decreased. A reason why the CPU 111 regards the weight as being decreased when the decreased amount is equal to or larger than a predetermined value is to prevent the CPU 101 from regarding the weight as being decreased in a case where the weight output by the first scale 108 changes due to factors such as vibration being applied to the self-service checkout device 100. When the weight output by the first scale 108 is not decreased, the CPU 101 makes a determination of No in Act 5 and the process proceeds to Act 6.

In Act 6, the CPU 101 checks whether or not operation instructing a registration completion is performed. That is, the CPU 101 checks whether or not predetermined operation such as touching a subtotal button displayed on the touch panel 104 is performed. The operation instructing the registration completion is set as a rule under a condition of operation performed after registering at least one piece of merchandise. In a case where the operation instructing the registration completion is performed in a state where no merchandise is registered, operation of the CPU 101 may be determined by a designer of the control program of the CPU 101. For example, the CPU 101 ignores the operation instructing the registration completion. Alternatively, in a state where no merchandise is registered, the CPU 101 may prevent the operation itself instructing the registration completion. When the operation instructing the registration completion is not performed, the CPU 101 makes a determination of No in Act 6 and the process returns to Act 4. In this way, the CPU 101 repeats Acts 4 to 6 until the salesperson ID is read, the weight is decreased, or the operation instructing the registration completion is performed.

An operator of the self-service checkout device 100 picks up one piece of merchandise to be registered in a merchandise list among merchandise placed in the first placing table S1. As a result, the weight output by the first scale 108 is decreased. When the weight output by the first scale 108 is decreased in a standby state of Acts 4 to 6, the CPU 101 makes a determination of Yes in Act 5 and the process proceeds to Act 7. In Act 7, the CPU 101 stores the decreased amount calculated in Act 5 in the main memory 102.

In Act 8, the CPU 101 waits for input of a merchandise code. The merchandise code is input to the CPU 101 described below. The operator of the self-service checkout device 100 causes the scanner 106 to read a barcode attached to the merchandise. Accordingly, a merchandise code corresponding to the barcode is input to the CPU 101. In addition, buttons associated with merchandise to which a barcode is not attached are displayed on the touch panel 104. The operator of the self-service checkout device 100 touches merchandise to be registered in the merchandise list among the buttons displayed on the touch panel 104. Accordingly, a merchandise code of merchandise associated with the button is input to the CPU 101. The merchandise code is identification information of with the merchandise. Therefore, by performing a process of Act 8, a computer having the CPU 101 operates as a reception unit which receives input of merchandise identification information associated with merchandise which is a payment target. When the merchandise code is input, the CPU 101 makes a determination of Yes in Act 8 and the process proceeds to Act 9.

In Act 9, the CPU 101 adds the merchandise code of which input is received in Act 8 to a merchandise list stored in the main memory 102 or the auxiliary storage device 103. Therefore, by performing a process of Act 9, a computer having the CPU 101 operates as a processing unit which processes sales data of the merchandise using the merchandise identification information of which input is received by the reception unit. After Act 9, the process proceeds to Act 10.

In Act 10, the CPU 101 waits for a weight output by the second scale 109 to be increased. At this time, the CPU 101 obtains the weight output by the second scale 109. Then, the CPU 101 calculates an increased amount by subtracting the second weight stored in Act 3 from the weight obtained by the second scale 109. If the increasing amount is equal to or larger than a predetermined value, the CPU 101 regards the weight output by the second scale 109 as being increased. A reason why the weight is considered to be increased when increasing amount is equal to or larger than a predetermined value is to prevent the CPU 101 from regarding the weight as being increased in a case where the weight output by the second scale 109 changes due to factors such as vibration being applied to the self-service checkout device 100. An operator of the self-service checkout device 100 places merchandise to be added to a merchandise list on the second placing table S2. As a result, the weight output by the second scale 109 is increased. When the weight output by the second scale 109 is increased, the CPU 101 makes a determination of Yes in Act 10 and the process proceeds to Act 11.

In Act 11, the CPU 101 compares increasing amount calculated in Act 10 with the decreased amount stored in Act 7 and determines whether or not weights are the same. At this time, in a case where a difference between the decreased amount and the increased amount is equal to or less than the reference value d1, the CPU 101 regards the weights as being the same. In a case where the CPU 101 regards the weights as not being the same in Act 11, some fraudulent operation might be carried out. Therefore, by performing a process of Act 11, a computer having the CPU 101 operates as a detection unit which detects fraudulent operation. When the weights are the same, the CPU 101 makes a determination of Yes in Act 11 and the process returns to Act 3. On the other hand, when the weights are not the same, the CPU 101 makes a determination of No in Act 11 and the process proceeds to Act 12.

In Act 12, the CPU 101 removes the merchandise code finally added to the merchandise list in Act 9 from the merchandise list stored in the main memory 102 or the auxiliary storage device 103.

In Act 13, the CPU 101 notifies that an error has occurred. For example, the CPU 101 generates an error screen. Then, the CPU 101 causes the touch panel 104 to display the screen. By receiving this instruction, the touch panel 104 displays the error screen. For example, the error screen includes a character string indicating that registration of merchandise is not normally performed and a character string indicating that merchandise to be finally registered has to be returned on the first placing table S1. In addition, for example, the CPU 101 inputs an audio signal corresponding to a sound message that registration of merchandise is not normally performed and a sound message that merchandise to be finally registered has to be returned on the first placing table S1 to the speaker 111. Accordingly, sounds represented by the audio signal are emitted by the speaker 111. Therefore, by performing a process of Act 13, a computer having the CPU 101 operates as a warning unit which emits a warning in a case where the detection unit detects the fraudulent operation. After Act 13, the process returns to Act 3.

When registration of merchandise of a payment target for one transaction, that is, all pieces of merchandise placed on the first placing table S1 is completed, an operator of the self-service checkout device 100 performs operation for instructing a registration completion. When the operation for instructing the registration completion is performed in a standby state of Acts 4 to 6, the CPU 101 makes a determination of Yes in Act 6 and the process proceeds to Act 14. In Act 14, the CPU 101 starts a weight monitoring process illustrated in FIG. 5. The CPU 101 performs the weight monitoring process in parallel with a control process illustrated in FIG. 3 by executing the weight monitoring process as a separate thread from the control process illustrated in FIG. 3.

Figure 5:
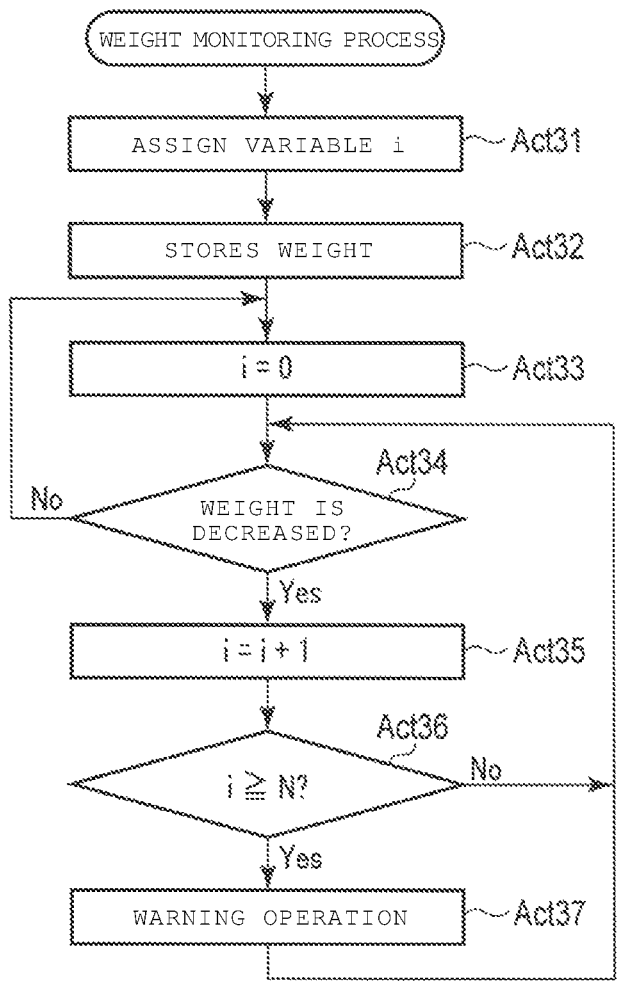
FIG. 5 is a flowchart of a control process according to the first embodiment, carried out by a CPU of the self-service checkout device in FIG. 2.

Hereinafter, the weight monitoring process illustrated in FIG. 5 will be described. In Act 31 of FIG. 5, the CPU 101 assigns a variable i to the main memory 102.

In Act 32, the CPU 101 obtains a weight output by the second scale 109 and stores the weight in the main memory 102.

In Act 33, the CPU 101 sets a value of the variable i to "0". In Act 34, the CPU 101 checks whether or not the weight output by the second scale 109 is decreased. At this time, the CPU 101 obtains the weight output by the second scale 109. Then, the CPU 101 calculates the decreased amount by subtracting the weight obtained by the second scale 109 from the weight stored in Act 32. If the decreased amount is equal to or larger than the reference value d2, the CPU 101 regards the weight output by the second scale 109 as being decreased. When the weight output by the second scale 109 is not decreased, the CPU 101 makes a determination of Yes in Act 34 and the process proceeds to Act 35.

In Act 35, the CPU 101 increases the value of the variable i by "1". In Act 36, the CPU 101 checks whether or not the value of the variable i is equal to or larger than a predetermined value N. When the value of the variable i is smaller than N, the CPU 101 makes a determination of No in Act 36 and the process returns to Act 34. That is, the CPU 101 makes a determination of No in Act 36 until the CPU 101 consecutively makes a determination of Yes in Act 34 N times. A reason is that the weight output by the second scale 109 may temporarily change due to factors such as vibration being applied to the self-service checkout device 100 and is to prevent from performing a process in Act 37 in such a case.

When an operator or the like of the self-service checkout device 100 picks up merchandise placed in the second placing table S2, the weight output by the second scale 109 is decreased. Then, when the merchandise is not returned to the second placing table S2, the CPU 101 consecutively makes a determination of Yes in Act 34 N times. When the value of the variable i is equal to or larger than N, the CPU 101 makes a determination of Yes in Act 36 and the process proceeds to Act 37. In Act 37, the CPU 101 performs a warning operation so as to warn the operator of the self-service checkout device 100 to return the merchandise to the second placing table S2. As an example, the CPU 101 generates a screen including a character string for warning the operator to return the merchandise to the second placing table S2. Then, the CPU 101 causes the touch panel 104 to display the screen. By receiving this instruction, the touch panel 104 displays the screen including the character string. In addition, as an example, the CPU 101 inputs an audio signal corresponding to sound for warning the operator to return the merchandise to the second placing table S2 to the speaker 111. Accordingly, sounds represented by the audio signal are emitted by the speaker 111. As described above, by performing a process of FIG. 5, a computer having the CPU 101 operates as a detection unit which detects a fraudulent operation. In addition, by performing a process of Act 37, a computer having the CPU 101 operates as a warning unit which emits a warning sound in a case where the detection unit detects the fraudulent operation.

Returning to the control process illustrated in FIG. 3. In Act 15 of FIG. 3, the CPU 101 performs a settlement process based on a merchandise code registered in a merchandise list. The CPU 101 obtains an amount of money, a merchandise name, and the like of merchandise indicated by the merchandise code from a merchandise database. Since a settlement process is a well-known process, a detailed explanation will be omitted. By performing a process of Act 15, a computer having the CPU 101 as a center operates as a settlement unit which performs a settlement process based on the sales data for one transaction processed by the processing unit.

In Act 16, the CPU 101 ends the weight monitoring process. After the process of Act 16, the process returns to Act 1.

By the way, there is a case where a salesperson operates the self-service checkout device by responding to a request of a customer who does not know how to operate the self-service checkout device 100. In this case, the salesperson causes the scanner 106 to read a barcode in which the salesperson ID is stored so as to operate the self-service checkout device 100 in the salesperson mode. For example, the barcode is printed on an ID card or the like owned by each of salespersons. When the salesperson ID is read in a standby state of Acts 4 to 6, the CPU 101 makes a determination of Yes in Act 4 and moves to Act 17. In Act 17, the CPU 101 performs a salesperson mode changing process illustrated in FIG. 6 so as to change the self-service checkout device 100 to the salesperson mode.

Figure 6:
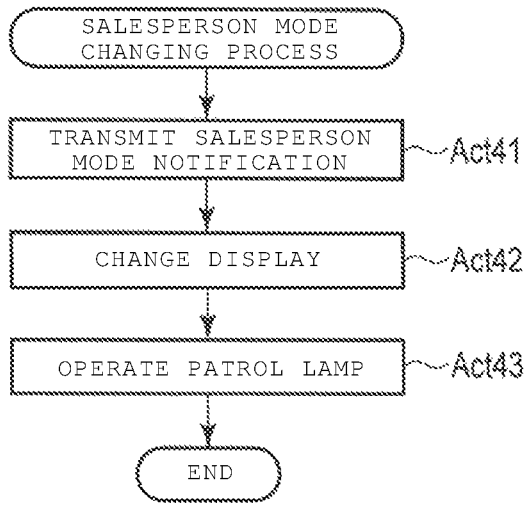
FIG. 6 is a flowchart of a control process according to the first embodiment and the second embodiment, carried out by a CPU of the self-service checkout device in FIG. 2 or 9.

In Act 41 of FIG. 6, the CPU 101 instructs the communication interface 105 to transmit a salesperson mode notification command indicating that a mode of the self-service checkout device 100 is changed to the salesperson mode to the attendant terminal 200. The salesperson mode notification command includes the device ID of the self-service checkout device 100 which transmits the salesperson mode notification command. By receiving an instruction of the CPU 101, the communication interface 105 transmits the salesperson mode notification command to the attendant terminal 200. The transmitted salesperson mode notification command is received by the communication interface 205 of the attendant terminal 200.

On the other hand, in Act 61 of FIG. 8, the CPU 201 of the attendant terminal 200 checks whether or not a salesperson mode notification command is received by the communication interface 205. When the salesperson mode notification command is not received, the CPU 201 makes a determination of No in Act 61 and the process proceeds to Act 62.

In Act 62, the CPU 201 checks whether or not a normal mode notification command is received by the communication interface 205. The normal mode notification command will be described below. When the normal mode notification command is not received, the CPU 201 makes a determination of No in Act 62 and the process returns to Act 61. In this way, the CPU 201 repeats Acts 61 to 62 until the salesperson mode notification command or the normal mode notification command is received. When the salesperson mode notification command is received in a standby state of Acts 61 to 62, the CPU 201 makes a determination of Yes in Act 61 and the process moves to Act 63.

In Act 63, the CPU 201 generates a screen indicating that the self-service checkout device 100 identified by the device ID included in the salesperson mode notification command checking reception in Act 62 operates in the salesperson mode. Then, the CPU 201 causes the touch panel 204 to display the screen. By receiving this instruction, the touch panel 204 displays the screen. After the process of Act 63, the process returns to Act 61. The process of Act 63 is performed based on a salesperson mode notification received from the self-service checkout device 100 in Act 41 of FIG. 6. Therefore, by performing a process of Act 41, a computer having the CPU 101 as a center operates as a notification unit which notifies that a threshold for detecting a fraudulent operation is reduced or a fraudulent operation will not be detected.

On the other hand, after the process of Act 41 of FIG. 6, the CPU 101 of the self-service checkout device 100 moves to Act 42. In Act 42 of FIG. 6, the CPU 101 generates a screen for the salesperson mode. Then, the CPU 101 causes the touch panel 104 to display the screen. By receiving this instruction, the touch panel 104 displays the screen for the salesperson mode. The screen for the salesperson mode includes a character string indicating that the self-service checkout device 100 operates in the salesperson mode and buttons for instructing release of the salesperson mode. In a screen for the normal mode displayed when the self-service checkout device 100 operates in the normal mode, the character string and the buttons are not displayed. Therefore, by performing a process of Act 42, a computer having the CPU 101 as a center operates as a notification unit which notifies that the threshold for detecting a fraudulent operation is reduced or a fraudulent operation will not be detected. In Act 43, the CPU 101 operates the patrol lamp 110. In the normal mode, the patrol lamp 110 is not operated. Therefore, by performing a process of Act 43, a computer having the CPU 101 operates as a notification unit which notifies that the threshold for detecting the fraudulent operation is reduced or the fraudulent operation will not be detected. After that, the CPU 101 ends the salesperson mode changing process.

Figure 4:
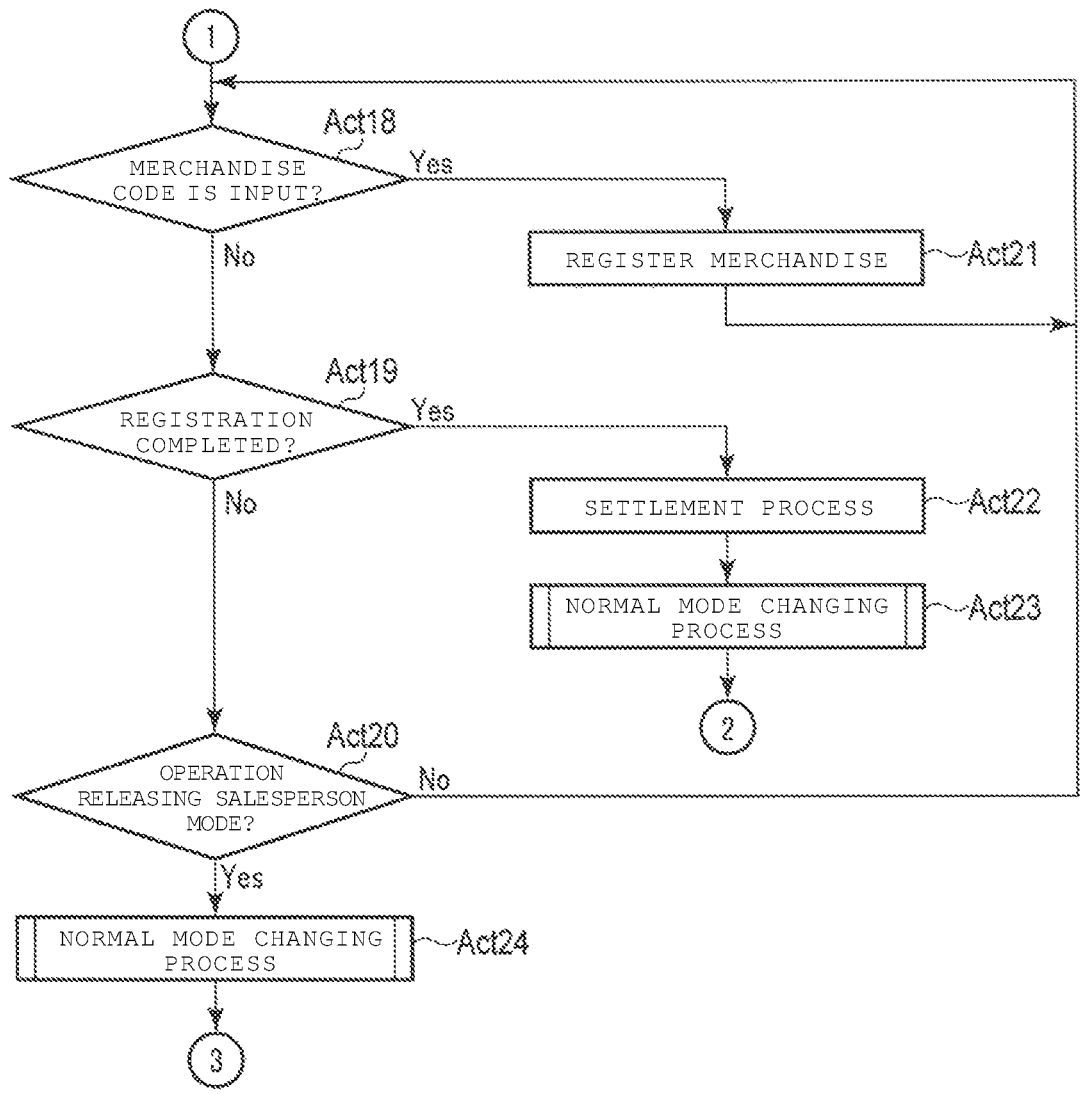
FIG. 4 is a flowchart of a control process according to the first embodiment, carried out by a CPU of the self-service checkout device in FIG. 2.

After the salesperson mode changing process illustrated in Act 17 of FIG. 3, the process moves to Act 18 of FIG. 4. FIG. 4 illustrates operation in the salesperson mode. In Act 18 of FIG. 4, the CPU 101 checks whether or not a merchandise code is input in the same manner as Act 8. The merchandise code is input to the CPU 101 described in Act 8. When the merchandise code is not input, the CPU 101 makes a determination of No in Act 18 and the process proceeds to Act 19.

In Act 19, the CPU 101 checks whether or not an operation instructing a registration completion is performed in the same manner as Act 6. When the operation instructing the registration completion is not performed, the CPU 101 makes a determination of No in Act 19 and the process proceeds to Act 20.

In Act 20, the CPU 101 checks whether or not an operation releasing the salesperson mode is performed. That is, the CPU 101 checks whether or not a predetermined operation such as touching a button, which is displayed on the touch panel 104, for instructing release of the salesperson mode is performed. When the operation releasing the salesperson mode is not performed, the CPU 101 makes a determination of No in Act 20 and the process returns to Act 18. In this way, the CPU 101 repeats Acts 18 to 20 until the merchandise code is input, the operation instructing the registration completion is performed, or the operation releasing the salesperson mode is performed. When the merchandise code is input in a standby state of Acts 18 to 20, the CPU 101 makes a determination of Yes in Act 18 and the process proceeds to Act 21.

In Act 21, the CPU 101 adds the merchandise code checked to be input in Act 18 to a merchandise list stored in the main memory 102 or the auxiliary storage device 103. Therefore, by performing a process of Act 21, a computer having the CPU 101 operates as a processing unit which processes sales data of the merchandise using the merchandise identification information of which input is received by the reception unit. After the process of Act 21, the process returns to Act 18.

When the operation for instructing the registration completion is performed in a standby state of Acts 18 to 20, the CPU 101 makes a determination of Yes in Act 19 and the process proceeds to Act 22. In Act 22, the CPU 101 performs a settlement process based on a merchandise code registered in a merchandise list. The CPU 101 obtains an amount of money, a merchandise name, and the like of merchandise indicated by the merchandise code from a merchandise database. Since a settlement process is a well-known process, a detailed explanation will be omitted. By performing a process of Act 22, a computer having the CPU 101 as a center operates as a settlement unit which performs a settlement process based on the sales data for one transaction processed by the processing unit. As described above, in the salesperson mode illustrated in FIG. 4, determinations of weights in Act 5, Act 7, Act 10, and Act 11 illustrated in FIG. are not performed. Further, in the salesperson mode illustrated in FIG. 4, the processes of Act 14 and Act 16 are not performed and the weight monitoring process illustrated in FIG. 5 is not performed. Therefore, by performing the process in FIG. 4, a computer having the CPU 101 operates as a control unit which controls the detection unit so as not to detect a fraudulent operation on condition that it is authenticated that an operator is a specific operator.

Figure 7:
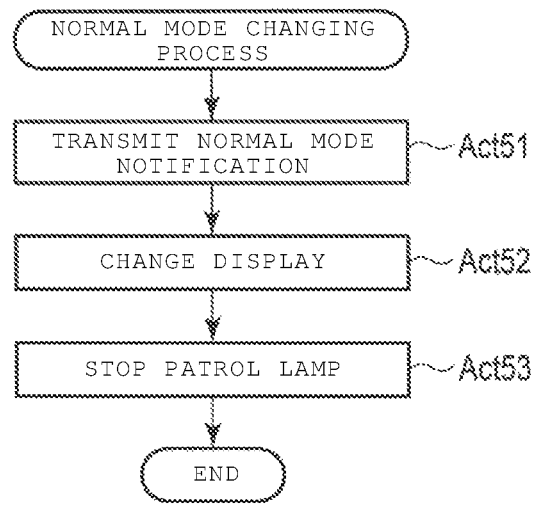
FIG. 7 is a flowchart of a control process according to the first embodiment and the second embodiment, carried out by a CPU of the self-service checkout device in FIG. 2 or 9.
Figure 8:
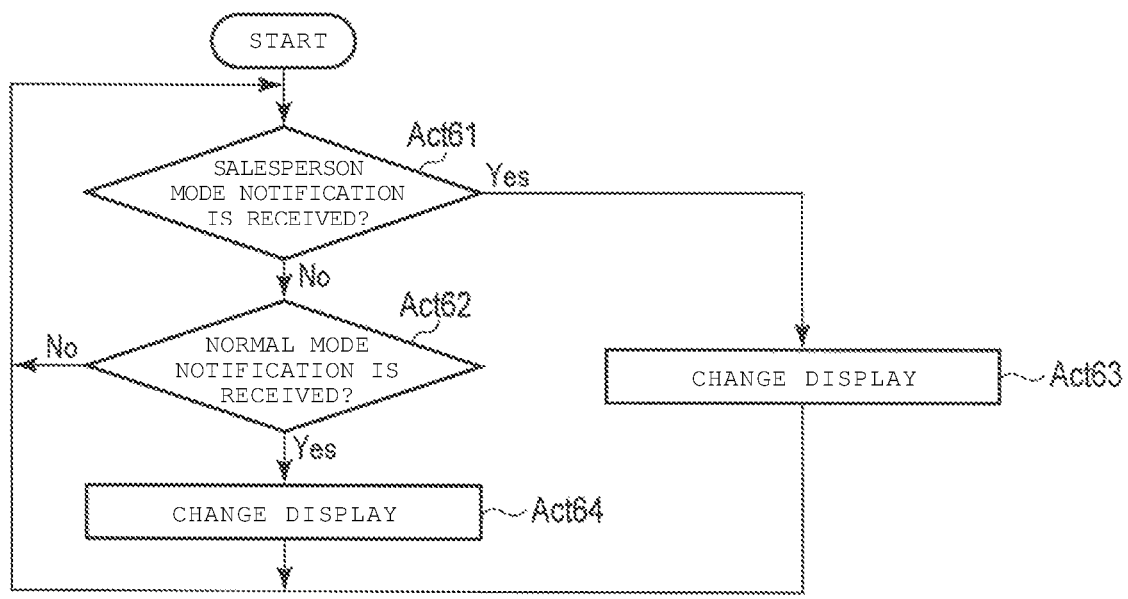
FIG. 8 is a flowchart of a control process according to the first embodiment and the second embodiment, carried out by a CPU of an attendant terminal in FIG. 2 or 9.

In Act 23, the CPU 101 performs a normal mode changing process illustrated in FIG. 7 so as to change the self-service checkout device 100 to the normal mode.

In Act 61 of FIG. 7, the CPU 101 instructs the communication interface 105 to transmit a normal mode notification command indicating that a mode of the self-service checkout device 100 is changed to the normal mode to the attendant terminal 200. The normal mode notification command includes the device ID of the self-service checkout device 100 which transmitted the normal mode notification command. By receiving an instruction of the CPU 101, the communication interface 105 transmits the normal mode notification command to the attendant terminal 200. The transmitted normal mode notification command is received by the communication interface 205 of the attendant terminal 200.

On the other hand, when the normal mode notification command is received in a standby state of Acts 61 to 62 in FIG. 8, the CPU 201 of the attendant terminal 200 makes a determination of Yes in Act 62 and the process proceeds to Act 64.

In Act 64, the CPU 201 generates a screen indicating that the self-service checkout device 100 identified by the device ID included in the normal mode notification command checking reception in Act 62 operates in the normal mode. Then, the CPU 201 causes the touch panel 204 to display the screen. By receiving this instruction, the touch panel 204 displays the screen. After the process of Act 64, the process returns to Act 61.

On the other hand, after the process of Act 51 of FIG. 7, the CPU 101 of the self-service checkout device 100 moves to Act 52. In Act 52 of FIG. 7, the CPU 101 generates a screen for the normal mode. Then, the CPU 101 causes the touch panel 104 to display the screen. By receiving this instruction, the touch panel 104 displays the screen for the normal mode. In Act 53, the CPU 101 stops the patrol lamp 110. Then, the CPU 101 ends the normal mode changing process.

After the normal mode changing process illustrated in Act 23 of FIG. 4, the CPU 101 returns to Act 1 of FIG. 3. In addition, when an operation releasing the salesperson mode is performed in a standby state of Acts 18 to 20 in FIG. 4, the CPU 101 makes a determination of Yes in Act 20 and the process proceeds to Act 24. In Act 24, the CPU 101 performs the normal mode changing process illustrated in FIG. 8. After the normal mode changing process illustrated in Act 24, the process returns to Act 3 of FIG. 3.

According to the self-service checkout device 100 of the first embodiment, an operation mode is changed to a salesperson mode in response to reading the salesperson ID. The self-service checkout device 100 operating in the salesperson mode does not perform determinations of weights in Act 5, Act 7, Act 10, and Act 11 of the normal mode. In the normal mode, there is a case where it is determined as No in Act 11 and an error occurs when trying to register merchandise quickly. The salesperson can register the merchandise without concern for the error by changing to the salesperson mode and registering the merchandise. In addition, the self-service checkout device 100 operating in the salesperson mode does not perform the weight monitoring process illustrated in FIG. 5. Therefore, when the self-service checkout device 100 operates in the salesperson mode, even if merchandise is picked up from the second placing table S2 by a salesperson or a customer before the settlement process is ended, the self-service checkout device 100 does not perform the warning operation. Accordingly, the salesperson or the customer can start bagging or the like of merchandise before an end of the settlement process.

In addition, according to the self-service checkout device 100 of the first embodiment, the scanner 106 simultaneously reads a barcode attached to merchandise and a barcode in which the salesperson ID is recorded. Therefore, a manufacturing cost and the like of the self-service checkout device 100 can be reduced compared with a case where a device performing an input of a merchandise code and a device performing an input of a salesperson ID are separated.

In addition, according to the self-service checkout device 100 of the first embodiment, when the self-service checkout device 100 operates in the salesperson mode, a screen indicating that the self-service checkout device 100 operates in the salesperson mode is displayed on the touch panel 204 of the attendant terminal 200. In addition, when the self-service checkout device 100 operates in the salesperson mode, the self-service checkout device 100 displays the screen for the salesperson mode on the touch panel 104. In addition, when the self-service checkout device 100 operates in the salesperson mode, the self-service checkout device 100 operates the patrol lamp 110. As a result, the salesperson can easily know that the self-service checkout device 100 operates in the salesperson mode.

Second Embodiment

Figure 9:
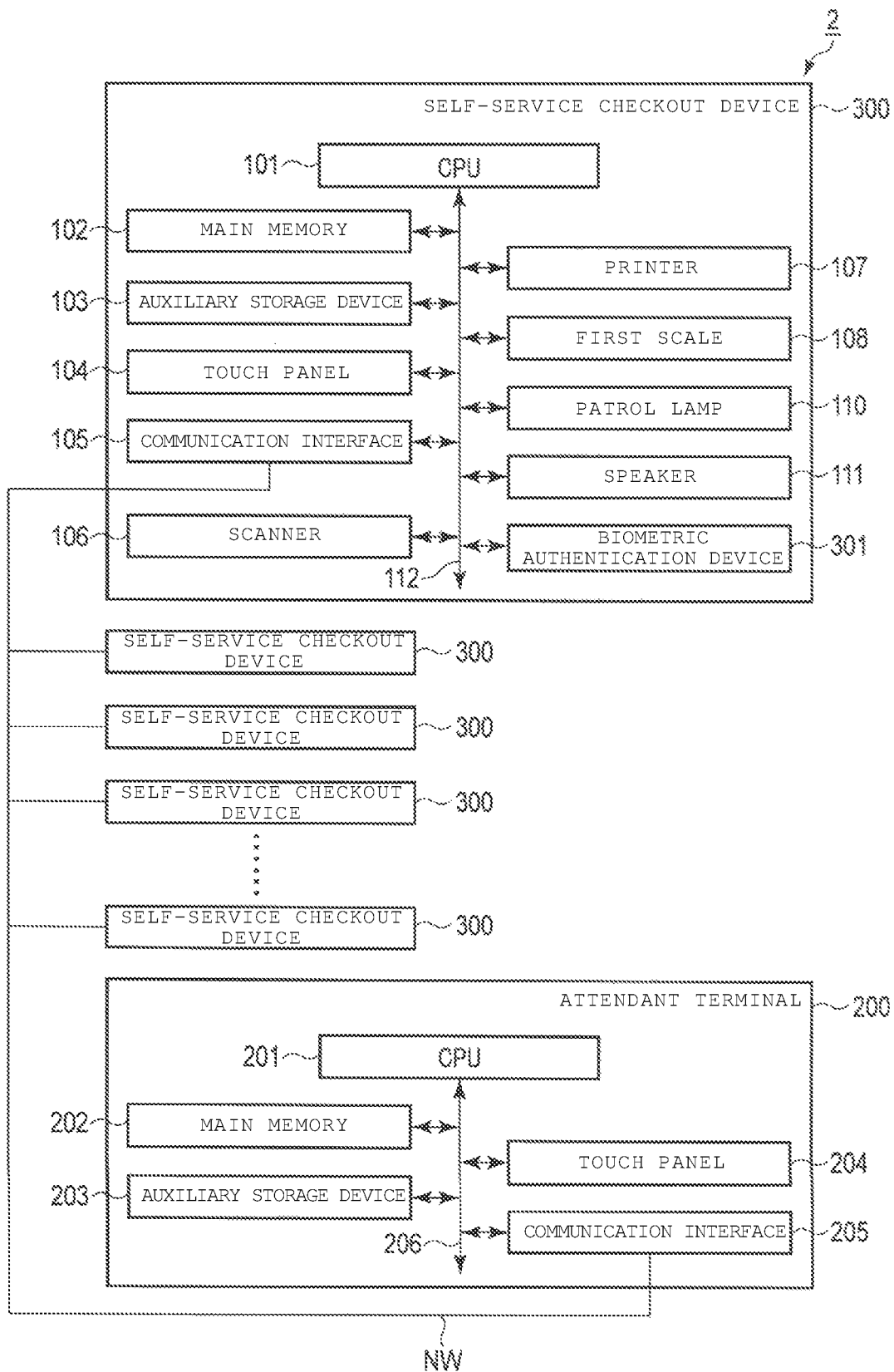
FIG. 9 is a block diagram illustrating a main circuit configuration of each of devices included in a self-service checkout system according to the second embodiment.

Hereinafter, a self-service checkout device according to a second embodiment will be described with reference to drawings. In each of drawings and the following description according to the second embodiment, the same reference numerals are attached to the same elements as those in the first embodiment. Therefore, there is a case where description of the same element may be omitted. Since an exterior of a self-service checkout device 300 according to the second embodiment is the same as the self-service checkout device 100 illustrated in FIG. 1 of the first embodiment, description of the exterior of the self-service checkout device 300 will be omitted. FIG. 9 is a block diagram of a main circuit configuration of each of devices included in a self-service checkout system 2 using the self-service checkout device 300 according to the second embodiment. The self-service checkout device 300 is not required to provide the second scale 109 unlike the first embodiment. Instead, the self-service checkout device 300 includes a biometric authentication device 301 unlike the first embodiment.

The biometric authentication device 301 reads biometric information indicating a characteristic of a specific person. The biometric information read by the biometric authentication device 301 is, for example, a physical characteristic such as a face, a fingerprint, and vein pattern or a behavioral characteristic such as a pattern of walking or blinking.

In the second embodiment, the auxiliary storage device 103 of the self-service checkout device 300 stores biometric information of each of salespersons who work at a store. In addition, in the second embodiment, the auxiliary storage device 103 stores an reference value d3. The reference value d3 indicates an upper limit of an acceptable difference in determination of weights in the same manner as the reference value d1. It is assumed that a value of the reference value d3 is larger than a value of the reference value d1. The reference value d3 is set in advance by an administrator or the like of the self-service checkout device 300. In a case where a value of the reference value d3 is not set by an administrator or the like of the self-service checkout device 300, the reference value d3 is set to a default value. The default value of the reference value d3 is, for example, set in advance by a designer of the self-service checkout device 300. Further, in the second embodiment, a merchandise database stored by the auxiliary storage device 103 also stores a weight of each piece of merchandise.

Figure 10:
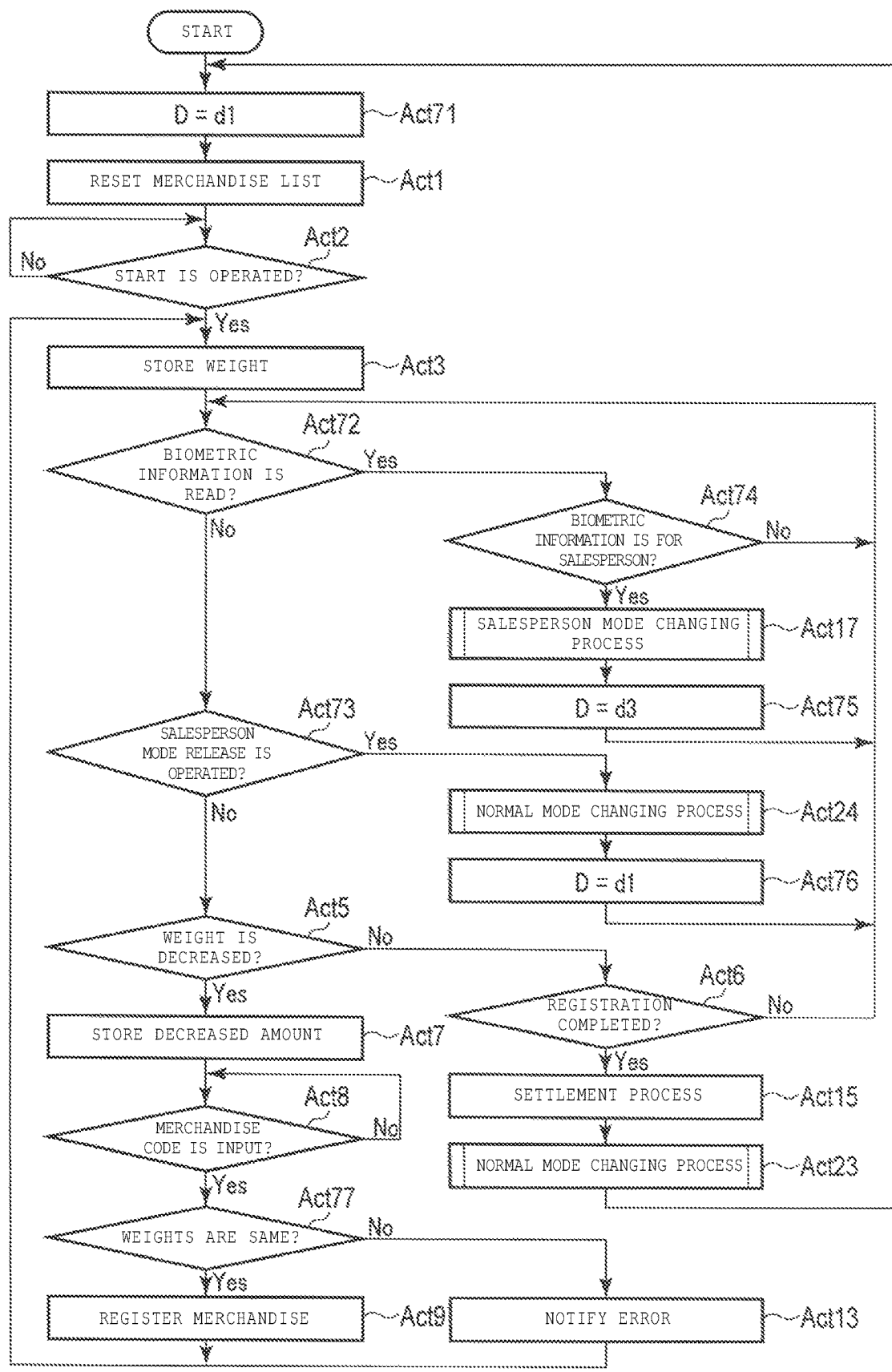
FIG. 10 is a flowchart of a control process according to the second embodiment, carried out by a CPU of the self-service checkout device in FIG. 9.

In the second embodiment, the main memory 102 or the auxiliary storage device 103 of the self-service checkout device 300 stores a control program described with respect to control processes illustrated in FIGS. 6, 7, and 10. FIG. 10 is a flowchart of control processes according to the CPU 101 of the self-service checkout device 300. In addition, in the second embodiment, the main memory 202 or the auxiliary storage device 203 of the attendant terminal 200 stores a control program described with respect to a control processes illustrated in FIG. 8 in the same manner as the first embodiment.

Hereinafter, operation of the self-service checkout system 2 using the self-service checkout device 300 according to the second embodiment will be described with reference to FIGS. 6 to 8 and FIG. 10. Furthermore, contents of a process in the operation to be described below are one example, various processes can be appropriately carried out so as to achieve same results. In the second embodiment, before the process of Act 1, the CPU 101 performs a process of Act 71. In Act 71 of FIG. 10, the CPU 101 assigns a variable D of which initial value is d1 to the main memory 102. After the process of Act 71, the self-service checkout device 300 operates in the normal mode.

In the second embodiment, the CPU 101 performs a process of Act 72 instead of Act 4 carried out in the first embodiment. In Act 72, the CPU 101 checks whether or not biometric information is read by the biometric authentication device 301. When the biometric information is not read, the CPU 101 makes a determination of No in Act 72 and the process proceeds to Act 73.

In Act 73, the CPU 101 checks whether or not operation releasing the salesperson mode is performed in the same manner as Act 20. When the operation releasing the salesperson mode is not performed, the CPU 101 makes a determination of No in Act 73 and the process proceeds to Act 5. Act 5 and Act 6 are the same as the first embodiment. However, in a case of No in Act 6, the process returns to Act 72. In this way, in Act 72, Act 73, Act 5, and Act 6, the CPU 101 repeats Act 72, Act 73, Act 5, and Act 6 until the biometric information is read, the operation releasing the salesperson mode is performed, the weight is decreased, or the operation instructing the registration completion is performed. When biometric information is read in a standby state of Act 72, Act 73, Act 5, and Act 6, the CPU 101 makes a determination of Yes in Act 72 and the process proceeds to Act 74.

In Act 74, the CPU 101 checks whether or not the biometric information checked to be read in Act 72 is for a salesperson with reference to biometric information stored in the auxiliary storage device 103. Therefore, by performing processes of Act 72 and Act 74, a computer having the CPU 101 operates as an authentication unit which authenticates whether or not an operator is a predetermined specific operator. When the biometric information is not for a salesperson, the CPU 101 makes a determination of No in Act 74 and the process returns to Act 72. On the other hand, when the biometric information is for a salesperson, the CPU 101 makes a determination of Yes in Act 74 and the process proceeds to Act 17. After the process of Act 17, the CPU 101 moves to Act 75 in the same manner as the first embodiment. In Act 75, the CPU 101 sets a value of the variable D to "d3". After the process of Act 75, the process returns to Act 72. After the process of Act 75, the self-service checkout device 300 operates in the salesperson mode.

In the same manner as the first embodiment, there is a case where a salesperson operates the self-service checkout device by responding to a request of a customer who does not know how to operate the self-service checkout device 300. In this case, the salesperson causes the biometric authentication device 301 to read biometric information of the salesperson so as to operate the self-service checkout device 300 in the salesperson mode. When the operation releasing the salesperson mode is performed in a standby state of Act 72, Act 73, Act 5, and Act 6, the CPU 101 makes a determination of Yes in Act 73 and the process proceeds to Act 24. After the process of Act 24, the process proceeds to Act 76 in the same manner as the first embodiment. In Act 76, the CPU 101 sets a value of the variable D to "d1". After the process of Act 76, the process returns to Act 72. After the process of Act 76, the self-service checkout device 300 operates in the normal mode.

In addition, in the second embodiment, the CPU 101 makes a determination of Yes in Act 8 and then the process proceeds to Act 77. In Act 77, the CPU 101 compares decreasing amount stored in Act 7 with a weight stored in a merchandise database for merchandise specified by a merchandise code of which input is received in Act 8 and determines whether or not weights are the same. At this time, in a case where a difference between the decreasing amount and the weight stored in the merchandise database is equal to or less than the variable D, the CPU 101 regards that the weights as being the same. In a case where the CPU 111 regards the weights as not being the same in Act 77, there is a possibility that some fraudulent operation is carried out. Therefore, by performing a process of Act 77, a computer having the CPU 101 operates as a detection unit which detects the fraudulent operation. When the weights are the same, the CPU 101 makes a determination of Yes in Act 77 and the process proceeds to Act 9. On the other hand, when the weights are not the same, the CPU 101 makes a determination of No in Act 77 and the process proceeds to Act 13. A value of the variable D is d1 in the normal mode and is d3 larger than d1 in the salesperson mode. That is, in the salesperson mode, the threshold for detecting fraudulent operation is reduced. Therefore, by performing the process in Act 75, a computer having the CPU 101 operates as a control unit which controls the detection unit so as to reduce the threshold for the detecting fraudulent operation on condition that it is authenticated that an operator is a specific operator.

Unlike the first embodiment, the CPU 101 does not perform the processes of Acts 10 to 12, Act 14, Act 15 and Act 16 in the second embodiment. In addition, after Act 15, the process proceeds to Act 23. After Act 23, the process returns to Act 71 in the same manner as the first embodiment.

According to the self-service checkout device 300 of the second embodiment, by reading biometric information and performing biometric authentication, it is identified whether or not an operator is a salesperson. Therefore, security is improved as compared with a case where the salesperson ID is used.

The first embodiment and the second embodiment described above can also be modified as follows. In the first embodiment, the salesperson ID performs authentication. However, a biometric authentication device is provided in the self-service checkout device 100 and biometric authentication may be performed in the same manner as the second embodiment. In addition, in the second embodiment, biometric authentication is performed using the biometric authentication device. However, the salesperson ID may perform authentication in the same manner as the first embodiment.

In the first embodiment, the salesperson ID is recorded in a barcode. However, the salesperson ID may be stored in a magnetic card, a contact type integrated circuit (IC) card, a non-contact type IC card, or the like. As the non-contact IC card, standards such as radio frequency identifier (RFID), and near field communication (NFC) can be used. In the above case, a reading device corresponding to a recording method of the salesperson ID is provided in the self-service checkout device.

In the first embodiment and the second embodiment, an operator will be described as a salesperson. However, an excellent customer or the like also may be an operator instead of a salesperson.

In the first embodiment and the second embodiment, the couple of examples of the detection unit for detecting fraudulent operation are described. However, the self-service checkout device may be provided with another detection unit for detecting fraudulent operation. The self-service checkout device including the other detection unit does not perform the other detection in the salesperson mode in the same manner as the first embodiment or the second embodiment. Alternatively, the self-service checkout device reduces the threshold above which the other detection unit detects fraudulent operations in the salesperson mode. An example of the other detection unit is as follows. That is, by analyzing an operator, the self-service checkout device, and images obtained by capturing merchandise and the like of a payment target with a camera, the self-service checkout system determines whether or not the operator performs fraudulent operations (see, for example, Japanese Patent No. 5054670).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A self-service checkout terminal comprising:
   an optical code reader;
   a platform on which a container containing items to be subjected to a code reading by the optical code reader is placed;

a weight sensor configured to detect a weight of objects placed on the platform; and a processor configured to operate in a first mode and a second mode, carry out a registration process based on a merchandise code corresponding to a code symbol read from an item by the optical code reader while enabling a confirmation process to confirm proper item placement based on the weight detected by the weight sensor in the first mode, and carry out the registration process while disabling the confirmation process in the second mode, wherein the first mode is an operational mode for self-service checkout and the weight sensor is enabled during the first mode, and the second mode is an operational mode for non-self-service aided checkout and the weight sensor is disabled during the second mode.

2. The self-service checkout terminal according to claim 1, wherein
the processor switches from the first mode to the second mode, upon a code symbol associated with a user code of a predetermined user being read by the optical code reader.

3. The self-service checkout terminal according to claim 1, further comprising:
an biometric recognition device configured to recognize a biometric feature of a user, wherein
the processor switches from the first mode to the second mode, upon a biometric pattern unique to a predetermined user being recognized by the biometric authentication device.

4. The self-service checkout terminal according to claim 1, wherein the self-service checkout system further comprises:
a second platform on which items that have been subjected to the code reading are placed; and
a second weight sensor configured to detect a weight of objects placed on the second platform.

5. The self-service checkout terminal according to claim 4, wherein
during the confirmation process, the processor compares a decrease of a weight detected by the weight sensor before the code reading for an item and an increase of a weight detected by the second sensor after the code reading for the item, and generates an error notification upon a difference between the decrease of the weight and the increase of the weight being greater than a first threshold.

6. The self-service checkout terminal according to claim 5, wherein
the processor further cancels registration of the item upon the difference between the decrease of the weight and the increase of the weight being greater than the first threshold.

7. The self-service checkout terminal according to claim 1, wherein
the items to be purchased are items that have been subjected to a code reading by the optical code reader, and
during the confirmation process, the processor determines a decrease of the detected weight and carries out a warning operation based on the decrease of the detected weight.

8. The self-service checkout terminal according to claim 7, wherein
during the confirmation process, the processor counts a number of times a difference between a reference weight and the detected weight is equal to or greater than a second threshold, and generates a warning upon the counted number exceeding a predetermined number.

9. The self-service checkout terminal according to claim 1, further comprising:
a light-emitting indicator that is disabled during the first mode and enabled during the second mode.

10. The self-service checkout terminal according to claim 1, further comprising:
a display that is controlled by the processor to display a screen indicating that a current operational mode is the first mode when the processor operates in the first mode, and display a screen indicating that the current operational mode is the second mode when the processor operates in the second mode.

* * * * *